United States Patent [19]

Newberry et al.

[11] Patent Number: 5,625,406

[45] Date of Patent: Apr. 29, 1997

[54] UNIFIED PROGRAM GUIDE INTERFACE

[75] Inventors: Thomas P. Newberry, Westfield; Timothy W. Saeger, Indianapolis, both of Ind.; Enrique Rodriguez-Cavazos, L'Etang la Ville, France

[73] Assignee: Thomson Consumer Electronics, Inc., Indianapolis, Ind.

[21] Appl. No.: 674,666

[22] Filed: Jul. 2, 1996

Related U.S. Application Data

[63] Continuation of Ser. No. 397,003, Mar. 1, 1995, abandoned, which is a continuation of Ser. No. 362,649, Dec. 21, 1994, abandoned.

[51] Int. Cl.$^6$ .................................................. H04N 7/10
[52] U.S. Cl. ............................ 348/7; 348/906; 348/589
[58] Field of Search .............................. 348/906, 584, 348/589, 564, 6, 7, 12, 13, 600; H04N 7/10

[56] References Cited

U.S. PATENT DOCUMENTS

| | | | |
|---|---|---|---|
| 4,751,578 | 6/1988 | Reiter et al. | 348/906 |
| 5,047,867 | 9/1991 | Strubbe et al. | 348/906 |
| 5,231,493 | 7/1993 | Apitz | 348/906 |
| 5,552,833 | 9/1996 | Henmi et al. | 348/9.6 X |

Primary Examiner—Victor R. Kostak
Attorney, Agent, or Firm—Joseph S. Tripoli; Joseph J. Laks; Harvey D. Fried

[57] ABSTRACT

Analog and digital video signals are each representative of a picture and each may carry program guide information. A demultiplexer has the digital video signal as an input and the program guide information as an output. A demodulator has at least a luminance component of the analog video signal as an input and the program guide information as an output. A microprocessor, a video graphics adapter, the demultiplexer and the demodulator are interconnected by a data bus. Either of the program guide outputs is transferable to the video graphics adapter, which formats a graphics video signal representative of the program guide information. The graphics video signal and a selected one of the video signals are inputs to a multiplexer, which outputs a combined video signal representative of both the program guide information and the picture represented by the selected video signal.

27 Claims, 1 Drawing Sheet

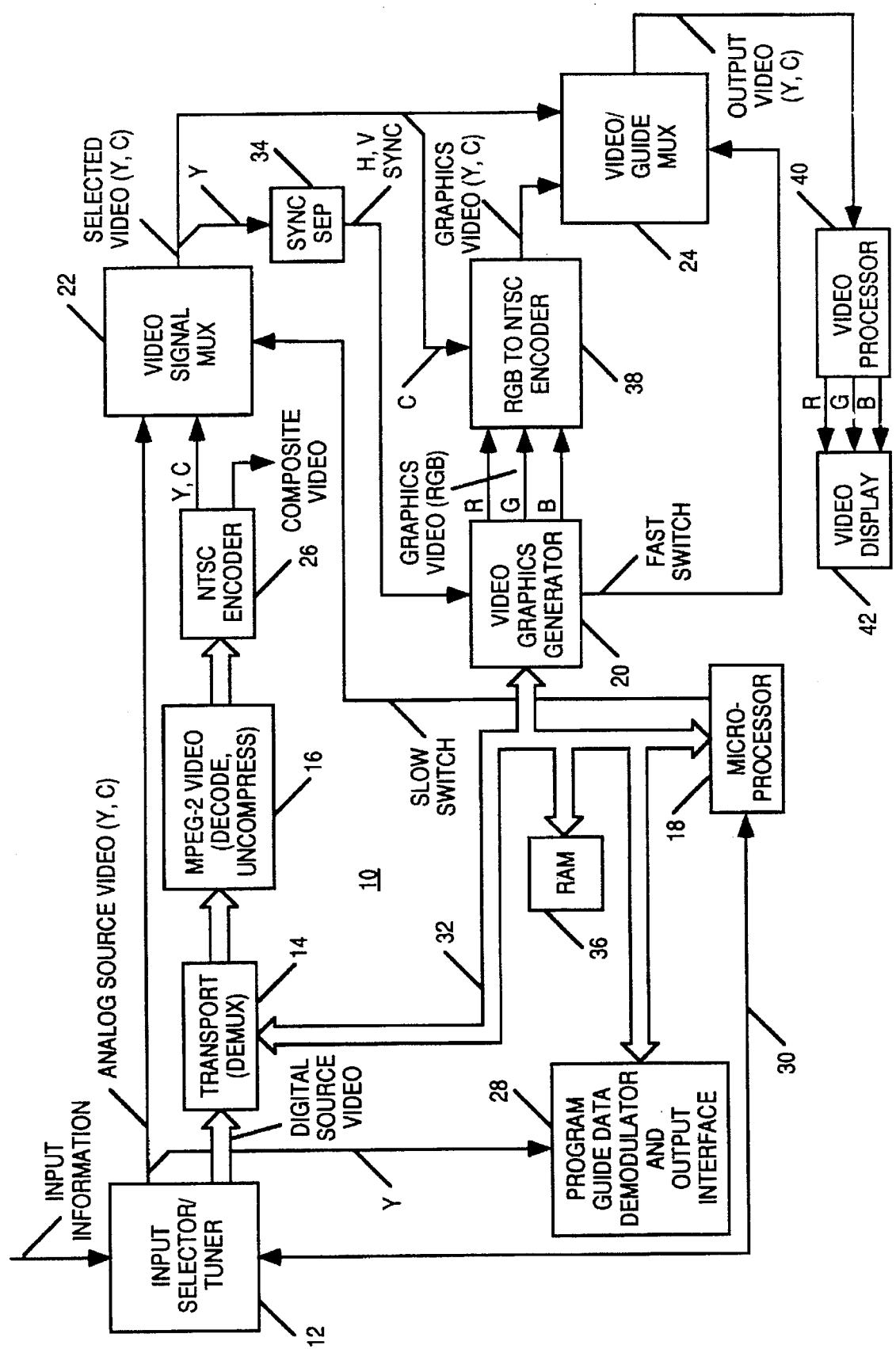

UNIFIED PROGRAM GUIDE INTERFACE

CROSS REFERENCE TO RELATED APPLICATIONS

This is a continuation of application Ser. No. 08/397,003, filed Mar. 1, 1995, and now abandoned which is a continuation of U.S. application Ser. No. 08/362,649, filed Dec. 21, 1994, and now abandoned.

BACKGROUND OF THE INVENTION

This invention relates to the field of integrated analog/digital receivers, including set-top boxes for television receivers and integrated receiver televisions.

Television set-top boxes or integrated receiver televisions will to be required to display pictures from both analog and digital video sources, for example, as may be provided over a broad band network, such as Hybrid (analog/digital) Fiber Coax (HFC) architectures currently being proposed by numerous telephone company's video on demand projects. These architectures would provide both analog and encoded digital video, for example encoded according to MPEG-2 standards, to set-top boxes, and eventually, to television receivers in which the functions of the set-top box have been integrated, so-called integrated receiver televisions. It is necessary to provide an enhanced, unified interface between the analog and digital channels.

Program guide or channel guide features are provided by services which compile and organize program information which can be displayed with or instead of program video. The terms program guide and channel guide are deemed to be equivalent and interchangeable. The information is often organized as a large grid or as a summary banner laid over a portion of the video. More detailed information about particular programs can be accessed by various menu and control functions, usually by means of a remote control device. Examples of information carried are: program start/stop time, program title, program description, program rating, and the like. It should be appreciated that program or channel guide information is not a dynamic signal, but carries essentially the same information for each day, week, etc., to the extent that program schedules are known in advance. It may be sufficient to detect and process program or channel guide information only several times per hour, for example, every fifteen or twenty minutes.

Program or channel guide information has been transmitted in information signals, for example FM radio signals, having no picture video content, that is, not in the conventional format of a video signal. Program or channel guide information has been transmitted with analog video signals, for example, during the vertical retrace interval. Program or channel guide information has been transmitted with digital video signals, for example, as part of the PSI (program specific information) table within a standard encoded transport stream, such as MPEG-2. Alternatively, other methods of delivery supported by MPEG-2 standards can be utilized. Other digital encoding schemes support similar data structures. Program or channel guide information has heretofore not been available for mixed or hybrid (analog/digital) systems, but such a feature is required for a practical hybrid system.

SUMMARY OF THE INVENTION

It is an aspect of this invention to provide a unified program or is channel guide function which is compatible with hybrid systems receiving both analog and digital signals, for example, analog and digital video signals and information signals. Such a unified program or channel guide function is particularly useful for use with television receivers equipped with set-top boxes and for integrated television receivers, as may be connected to large numbers of video sources through broad band networks, for example, telephone and satellite network interfaces.

A unified program guide interface in accordance with inventive arrangements may receive both analog and digital video signals and information signals, any or all of which may be carrying program guide information, and may display that information on both analog and digital channels as may be selected by viewer choice. Viewers can utilize this information, for example, in selecting programs for viewing or as an input to a VCR for recording. This may be displayed as a banner overlaid onto the video or as a full screen presentation with available choices.

Such a program guide interface may comprise: a source of analog and digital video signals, each of which is representative of a picture and each of which may carry program guide information; means for separating the program guide information from at least one of the analog and digital video signals; a video graphics generator; a microprocessor for routing the separated program guide information to the video graphics generator, the video graphics generator formatting a graphics video signal representative of the program guide information; and, means for combining the graphics video signal with any one of the analog and digital video signals to generate a combined video display including the program guide information and any one of the pictures.

An information signal carrying the program guide information may also available from the source. The microprocessor can also route the program guide information from the information signal to the video graphics generator, for the combined video display.

The means for separating the program guide information from the digital video signal may comprise a data packet transport stream demultiplexer. The means for separating the program guide information from the analog video signal may comprise a demodulator is for data transmitted in vertical blanking intervals.

The combining means may comprise: a first multiplexer for selecting between the digital and analog signals for display; and, a second multiplexer for selecting between the previously selected one of the digital and analog video signals and the graphics video signal.

BRIEF DESCRIPTION OF THE DRAWINGS

The sole FIGURE is a block diagram of a unified program guide interface according to an inventive arrangement.

DETAILED DESCRIPTION OF THE PREFERRED EMBODIMENTS

A unified program guide interface 10 is shown in block diagram form in the FIGURE. The interface 10 can accommodate a wide variety of operating conditions and operating possibilities. If it is determined that certain operating conditions or operating possibilities will not be encountered, or are not required, certain elements of the interface as illustrated may be omitted. Accordingly, the sole FIGURE represents a number of embodiments, when various subsets of the interface are considered. The interface is intended to be an input device to television receivers, video recorders, computers and the like. It is intended to form part of a larger interface or circuit which enables bidirectional data transmissions and communication.

An input selector/tuner 12 receives input information in the form of analog and digital video signals and information signals which may be in digital or analog form. It will be assumed for purposes of illustration that the digital video signals are carried in MPEG-2 transport format, and include program guide or channel information in a PSI table or other manner supported by MPEG-2 standards. The acronym PSI means program specific information.

The MPEG-2 transport formats utilize information packets to define a digital data stream. Each packet is provided with header information which provides a packet ID in addition to other information relevant to the demultiplexing and reconstruction of MPEG-2 data streams. The details of MPEG-2 data transmission do not form a part of this invention, and accordingly, are not described in more detail herein. In the illustrated embodiment, for example, packets of video signal information and program guide information are of interest. It is sufficient to recognize that data packets is carrying program guide information can be identified and separated from the data stream by an appropriate transport packet demultiplexer, the operation of which is understood by those skilled in the art according to the MPEG-2 standards. Similarly, techniques for decoding and uncompressing MPEG-2 data video streams are also know to those skilled in the art, and accordingly, are not described herein in detail.

The analog video signals may also include program or channel guide information. Techniques for transmitting program or channel guide information in the vertical blanking intervals of analog video signals, as well as for demodulating such analog video signals to separate the program guide or channel information in a receiver, are also known to those skilled in the art, and accordingly, are not described herein in detail.

Finally, the transmission, reception, demodulation and/or decoding of program or channel guide information in an information signal, which is not a video signal, and which may be in analog or digital form, is also known to those skilled in the art, and accordingly, not described herein in detail.

It is the distinctive characteristics of these different input signals, any or all of which can carry the same program or channel guide information, which creates the problem solved by the unified program guide interface which is described herein in detail.

The input selector/tuner 12 might now also be referred to as a NIM, or network interface module, in the context of interfacing with any network using an HFC architecture, for example a telephone network. Irrespective of the label, the outputs of the input selector/tuner can include an analog video signal in the form of luminance and chrominance components Y, C and a digital bit stream representing one of a plurality of encoded digital video signals, for example according to MPEG-2 standards. The information signal, which is not a video signal, can also be an output of the input to selector/tuner. Generally speaking, the analog and digital video signals are considered high speed signals, whereas the information signal is generally considered a low speed signal. The selection of inputs, by reason of one or more tuners, and route selection switches, is under the control of the microprocessor 18, which may is communicate with the input selector/tuner over bidirectional data and control lines 30. In view of the low speed character of the information signal, which is assumed to be in digital form for purposes of illustration in the FIGURE, a serial bus is adequate. The microprocessor 18 will be responsive to user generated commands, for example entered through a remote control or local control panel, not shown.

It should be noted that audio signal processing has been omitted from the FIGURE for the purposes of simplifying the illustration. The audio aspect of the input signals plays no part in the inventive arrangements described herein.

The analog video signal is an input to a video signal multiplexer 22. The digital bit stream is an input to a transport packet demultiplexer 14. The transport demultiplexer, in conjunction with the microprocessor 18, separates out the program guide information, when present, from the PSI tables of the data transport packets or from other supported means. The video data in the transport packets are decoded and uncompressed by an MPEG-2 video processor 16. The digital source video signal is an input to an NTSC encoder 26. Such NTSC encoders generally provide two analog output video signals, one of which is in luminance and chrominance components Y, C and the other of which is composite video. It will be appreciated that the encoder 26 may instead be a PAL or SECAM encoder, or any other such standard, as is appropriate. In the illustrated embodiment, the Y, C format video signal is a second input to the video signal multiplexer 22. The output of multiplexer 22 is a selected video signal in Y, C format. The selection is controlled by a slow switch control signal generated by the microprocessor 18.

The Y component of the analog source video is also an input to a program guide analog demodulator and output interface 28, which separates program guide information, when present, from the vertical blanking interval of the analog signal. The output interface makes the program guide information available in digital form, for example, as appropriate for parallel data transmission. Alternatively, the luminance component may be first converted to digital form, and thereafter, the program guide information can be separated by a digital demodulator. The program or channel guide information is separated by the transport packet demultiplexer 14 is also program or channel guide information in digital form, appropriate for parallel processing. The program or channel guide information in the information signal is in digital form, is received by the microprocessor 30 serially, and is converted by the microprocessor 18 to a parallel format.

The microprocessor 18 is interconnected over a parallel data bus 32 with the transport packet demultiplexer 14, the output interface of demodulator 28, a random access memory RAM 36 and a video graphics generator 20. The microprocessor can utilize internal memory and the RAM 36 to piece together, that is reconstruct, the program or channel guide information from any one of the input sources. The selection priority may be predetermined, according to a number of different operational scenarios. In one scenario, for example, the digital video signal may be the preferred first choice as the source, the analog video signal may be the second choice and the information signal may be the third choice, irrespective of which video signal is being displayed. In an alternative example, the first choice may be the video signal which is being displayed. The other video signal would become a second or backup source, if the video signal being displayed did not carry program or channel guide information, or if difficulties were encountered in decoding the first choice source. The information signal would be a third choice. In yet another alternative example, the information signal would always be a first choice, because only low speed processing is required for acquisition and decoding, which places a smaller operational demand on the processing time of the microprocessor. In this regard, it should be remembered that program or channel guide information carries essentially the same information for each day, week, etc., to the extent that program schedules are known in advance. It may be sufficient to separate and process program or channel guide information only several times per hour, for example, every fifteen or twenty minutes.

Whatever the source, the microprocessor 18 supplies the program or channel guide data to the video graphics generator 20, which may be a video graphics adapter, otherwise known as a VGA board as used in computers. The video graphics generator 20 arranges is the program or channel guide information into an auxiliary graphics video signal in analog RGB format. Horizontal and vertical synchronizing information (H, V SYNC) for the video graphics generator 20 is supplied by a synchronizing signal separator 34, which has as an input the luminance component Y of the selected video signal output of multiplexer 22. The RGB output of the video graphics generator 20 is an input to an RGB to NTSC encoder 30, which transforms the graphics video signal to luminance and chrominance Y, C format. The RGB to NTSC encoder 38 requires color burst information from the selected output video signal of multiplexer 22, and accordingly, the chrominance component C thereof is an input to the encoder 38. It will be appreciated that the encoder 38 may instead be an RGB to PAL or SECAM encoder, or any other such standard, as is appropriate.

The graphics video signal represents a video or picture source in the nature of an auxiliary picture combined with a main picture, which in this case is the selected video signal output of multiplexer 22. The display format may, for example, be similar to a picture-in-picture display, a side-by side display, a top-bottom display or variations of these formats. The nature of the display format will depend on the size of the combined picture and the display format ratio of the combined picture, that is, conventional (4×3) or wide screen (e.g., 16×9), and will be subject to user commands. Accordingly, the graphics video signal may be representative of, for example, a program grid which is a banner intended to form the top or bottom portion of a combined picture, or an overlay which may replace some or all of the main picture.

The selected output video signal from multiplexer 22 and the graphics video signal from encoder 38 are inputs to a video/program guide multiplexer 24. The output of multiplexer 24 is controlled by a fast switch signal generated by the video graphics generator 20. The combined output video signal of multiplexer 24, in luminance and to chrominance Y, C format is an input to a standard video processor 40, which supplies RGB signals to a video display 42. Video display 42 may be any kind of display, including but not limited to direct and projection cathode ray tubes, liquid crystal displays, electroluminescent displays and plasma displays. The video display may have a conventional display format ratio, for example 4×3, or a wide screen display format ratio, for example 16×9.

The unified program guide interface taught herein enables any input video signal selected for display to be displayed with program or channel guide information, irrespective of whether the selected video signal is of digital or analog origin, irrespective of whether the selected video signal carries program or channel guide information, and irrespective of whether the program guide information is carried in another analog signal, another digital signal or an information signal.

The invention may embodied in other specific forms without departing from the spirit or essential attributes thereof. Accordingly, reference should be made to the appended claims rather than the foregoing specification as indicating the true scope of the invention.

What is claimed is:

1. A program guide interface, comprising:
    a source of analog and digital video signals, each of which is representative of a picture and each of which may carry program guide information;
    first multiplexing means for selecting one of said analog and digital video signals for display;
    respective means for separating said program guide information from each of said analog and digital video signals;
    a video graphics generator;
    a microprocessor for routing said separated program guide information to said video graphics generator, said video graphics generator formatting a graphics video signal representative of said program guide information and supplying a control signal; and,
    second multiplexing means responsive to said control signal for combining said graphics video signal with said one of said analog and digital video signals selected by said first multiplexing means to generate a combined video display including said program guide information and any one of said pictures.

2. The interface of claim 1, wherein an information signal carrying said program guide information is also available from said source.

3. The interface of claim 2, wherein said microprocessor can also route said program guide information from said information signal to said video graphics generator, for said combined video display.

4. The interface of claim 1, further comprising means for selecting one of said analog and digital video signals for said combined display.

5. The interface of claim 1, further comprising a synchronizing signal separator for supplying scan synchronizing information to said video graphics generator.

6. The interface of claim 1, wherein said means for separating said program guide information comprises a data packet transport stream demultiplexer.

7. The interface of claim 1, wherein said means for separating said program guide information comprises a demodulator for data transmitted in vertical blanking intervals.

8. The interface of claim 1, wherein said combining means comprises:
    a first multiplexer for selecting between said digital and analog signals for display; and,
    a second multiplexer for selecting between said previously selected one of said digital and analog video signals and said graphics video signal.

9. The interface of claim 1, further comprising a video encoder coupled to said video graphics generator and said combining means.

10. The interface of claim 9, further comprising means for supplying a burst signal to said encoder.

11. A program guide interface, comprising:
    a source of analog and digital video signals, each of which is representative of a picture and each of which may carry program guide information;
    a demultiplexer having said digital video signal as an input and having said program guide information as a first program guide output;
    a demodulator having at least a luminance component of said analog video signal as an input and having said program guide information as a second program guide output;

a first multiplexer having said digital and analog video signals as inputs and having a selected video signal as an output; and, a video graphics adapter;

a microprocessor;

a data bus interconnecting said demultiplexer, said demodulator, said video graphics adapter and said microprocessor, any one of said first and second program guide outputs being transferable to said video graphics adapter, said video graphics adapter formatting a graphics video signal representative of said program guide information; and, a second multiplexer having said graphics video signal and said selected video signal as inputs and having a combined output video signal representative of both said program guide information and said picture represented by said selected video signal.

12. The interface of claim 11, wherein an information signal carrying said program guide information is also available from said source.

13. The interface of claim 12, wherein said microprocessor can also route said program guide information from said information signal to said video graphics generator.

14. The interface of claim 11, wherein:

said demultiplexer separates data packets from a digital data packet transport stream defining said digital video signal; and, said demodulator separates said program guide information from vertical blanking intervals of said analog video signal.

15. A program guide interface, comprising:

a source of an analog video signal representative of a first picture and including program guide information transmitted therewith, a digital video signal representative of a second picture and including said program guide information encoded therewith and an information signal including only said program guide information;

a first multiplexer for selecting one of said analog and digital video signals as a source for a video display;

means for separating said program guide information from each of said analog video signal, said digital video signal and said digital information signal;

a video graphics generator;

a microprocessor for routing said separated program guide information to said video graphics generator, said video graphics adapter formatting a graphics video signal representative of said program guide information; and, a second multiplexer for combining said graphics video signal with said selected one of said analog and digital video signals to generate a combined video display including one of said first and second pictures and said program guide information.

16. The interface of claim 15, wherein said separating means comprises a digital demultiplexer.

17. The interface of claim 15, wherein said separating means comprises an analog demodulator.

18. A program guide interface, comprising:

a source of analog and digital video signals, each of which is representative of a picture and each of which may carry program guide information;

means for separating said program guide information from at least one of said analog and digital video signals;

a video graphics generator;

a microprocessor for routing said separated program guide information to said video graphics generator, said video graphics generator formatting a graphics video signal representative of said program guide information;

a video encoder for said graphics video signal formatted by said video graphics generator; and, means for combining said encoded graphics video signal with any one of said analog and digital video signals to generate a combined video display including said program guide information and any one of said pictures.

19. The interface of claim 18, wherein said video encoder comprises an RGB to Y, C encoder.

20. The interface of claim 18, further comprising means for supplying a burst signal to said encoder.

21. A program guide interface, comprising:

a source of analog and digital video signals, each of which is representative of a picture and each of which may carry program guide information;

respective means for separating said program guide information from each of said analog and digital video signals;

a video graphics generator;

a microprocessor for routing said separated program guide information to said video graphics generator, said video graphics generator formatting a graphics video signal representative of said program guide information; and, means for combining said graphics video signal with either one of said analog and digital video signals to generate a combined video display including said program guide information and any one of said pictures.

22. The interface of claim 21, wherein said video graphics generator supplies a control signal to said combining means for switching between said graphics video signal and said either one of said analog and digital video signals.

23. The interface of claim 21, wherein an information signal carrying said program guide information is also available from said source; and, said microprocessor can also route said program guide information from said information signal to said video graphics generator, for said combined video display.

24. The interface of claim 21, further comprising means for selecting one of said analog and digital video signals for said combined display.

25. The interface of claim 21, wherein said means for separating said program guide information comprises:

a data packet transport stream demultiplexer; and, a demodulator for data transmitted in vertical blanking intervals.

26. A program guide interface, comprising:

a source of analog and digital video signals, each of which is representative of a picture and each of which may carry program guide information;

means for separating said program guide information from at least one of said analog and digital video signals;

a video graphics generator;

a microprocessor for routing said separated program guide information to said video graphics generator, said video graphics generator formatting a graphics video signal representative of said program guide information and supplying a control signal; and, multiplexing means responsive to said control signal for combining said graphics video signal with either one of said analog and digital video signals to generate a combined video display including said program guide information and any one of said pictures.

27. The interface of claim 23, further comprising means for selecting one of said analog and digital video signals for display, said multiplexing means combining said video graphics signal with said one of said analog and digital signals selected for display.

* * * * *